United States Patent
Stoot et al.

(10) Patent No.: US 12,469,238 B2
(45) Date of Patent: Nov. 11, 2025

(54) DIGITAL WAXING FOR DENTAL APPLIANCES

(71) Applicant: 3SHAPE A/S, Copenhagen K (DK)

(72) Inventors: Adam Carsten Stoot, Søborg (DK); Mathias Brännström, Malmö (SE)

(73) Assignee: 3SHAPE A/S, Copenhagen K (DK)

( * ) Notice: Subject to any disclaimer, the term of this patent is extended or adjusted under 35 U.S.C. 154(b) by 239 days.

(21) Appl. No.: 17/913,860

(22) PCT Filed: Mar. 25, 2021

(86) PCT No.: PCT/EP2021/057790
§ 371 (c)(1),
(2) Date: Sep. 23, 2022

(87) PCT Pub. No.: WO2021/191374
PCT Pub. Date: Sep. 30, 2021

(65) Prior Publication Data
US 2023/0351712 A1 Nov. 2, 2023

(30) Foreign Application Priority Data
Mar. 27, 2020 (DK) .............................. PA202070193

(51) Int. Cl.
*G06T 19/20* (2011.01)
*A61C 13/34* (2006.01)
(Continued)

(52) U.S. Cl.
CPC .............. *G06T 19/20* (2013.01); *A61C 13/34* (2013.01); *G06T 5/30* (2013.01); *G06T 17/20* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 3,683,360 A | * 8/1972 | Matsushita | ............. G06F 3/153 345/27 |
| 9,364,296 B2 | 6/2016 | Kuo | |

(Continued)

FOREIGN PATENT DOCUMENTS

| | | |
|---|---|---|
| EP | 2895102 B1 | 3/2014 |
| EP | 3251635 A1 | 12/2017 |

(Continued)

OTHER PUBLICATIONS

First Office Action issued on Aug. 25, 2023, by the Chinese Patent Office in corresponding Chinese Patent Application No. 202180023227.6, and an English Translation of the Office Action. (16 pages).

(Continued)

*Primary Examiner* — Jason A Pringle-Parker
(74) *Attorney, Agent, or Firm* — Buchanan Ingersoll & Rooney PC

(57) ABSTRACT

Disclosed is a computer implemented method for generating a dental appliance including obtaining a first 3D digital surface representation of one or more teeth of a patient; creating a number of points in 3D space around the 3D digital surface representation, calculating the shortest distance from each of the points to the 3D digital surface representation; generating a modified 3D digital surface representation by dilating the surface of the object a defined value by using the calculated distances; and generating a resulting 3D digital surface representation of the dental appliance by erosion of the modified 3D digital surface representation inwards.

12 Claims, 6 Drawing Sheets

(51) Int. Cl.
*G06T 5/30* (2006.01)
*G06T 17/20* (2006.01)

(56) References Cited

U.S. PATENT DOCUMENTS

| | | | |
|---|---|---|---|
| 2005/0267584 A1* | 12/2005 | Burdulis | A61F 2/3859 623/20.19 |
| 2006/0281041 A1 | 12/2006 | Rubbert et al. | |
| 2008/0182220 A1 | 7/2008 | Chishti et al. | |
| 2010/0111370 A1* | 5/2010 | Black | G06F 18/2321 705/26.1 |
| 2011/0086322 A1 | 4/2011 | Baron et al. | |
| 2012/0072177 A1* | 3/2012 | Manai | G06F 30/00 703/1 |
| 2015/0269775 A1* | 9/2015 | Thompson | G06T 17/10 345/420 |
| 2018/0303581 A1 | 10/2018 | Martz et al. | |
| 2019/0090984 A1* | 3/2019 | Martz | A61C 7/08 |
| 2019/0105128 A1 | 4/2019 | Velazquez et al. | |
| 2019/0152152 A1* | 5/2019 | O'Leary | B33Y 30/00 |
| 2020/0093576 A1 | 3/2020 | Cinader, Jr. et al. | |

FOREIGN PATENT DOCUMENTS

| | | |
|---|---|---|
| EP | 3473204 A1 | 4/2019 |
| EP | 3620130 A1 | 3/2020 |
| WO | 2009094576 A1 | 7/2009 |

OTHER PUBLICATIONS

Office Action (Communication) issued on Sep. 25, 2023, by the European Patent Office in corresponding European Patent Application No. 21 715 859.1. (7 pages).

Pojda et al., "Applying Computational Geometry to Designing an Occlusal Splint", Institute of Theoretical and Applied Informatics, Polish Academy of Sciences, 2019, pp. 186-200, XP47508663.

"CEREC STL Night Guard" by August de Oliveira, published Mar. 8, 2017. YouTune [online] [video] [retrieved on Sep. 30, 2020]. Retrieved from https://www.youtube.com/watch?v=EY9w4tDFIBY.

"Creating a Custom Impression Tary in Meshmixer" by N. Cory Glenn, published Jun. 27, 2018. YouTube (online) [video] [retrieved on Sep. 30, 2020]. Retrieved from https://www.youtube.com/watch?=gQFUoH9FhS8.

International Search Report (PCT/ISA/210) and Written Opinion (PCT/ISA/237) mailed on May 28, 2021, by the European Patent Office as the International Searching Authority for International Application No. PCT/EP2021/057790. (13 pages).

* cited by examiner

301a

303a

303b

403c

403d

403e

403f

DIGITAL WAXING FOR DENTAL APPLIANCES

FIELD

This invention generally relates to a system and method for generating and designing dental appliances. In particular, it relates to methods for generating dental appliances without the need for manually adding extra material to a teeth model, before manufacturing the dental appliance.

BACKGROUND

One of the most time-consuming parts of designing well-fitting and comfortable dental appliances such as splints, nightguards, mouthguards, bleaching trays, aligners and surgical guides, is to ensure a spacing between the tooth margin and the appliance. On gypsum or stone models on which dental appliances such as splints are created, fissures and interproximal spaces need to be waxed as well to have a splint that can be both positioned and removed. This is normally a time consuming, manual process which can typically take up to 5-10 minutes.

Providing a digital/computer implemented method of designing such dental appliances without the need for large amounts of manual labor is of great interest. In the following, such a method will be disclosed and, in particular a process that allows for improved appliance design.

SUMMARY

In one aspect there is disclosed a computer implemented method for generating a dental appliance or for generating a model for creating the dental appliance on, comprising:
  obtaining a first 3D digital surface representation of one or more teeth of a patient;
  creating a number of points in 3D space around the 3D digital surface representation;
  calculating the shortest distance from each of the points to the 3D digital surface representation;
  generating a modified 3D digital surface representation by dilating the surface of the object a defined value by using the calculated distances; and
  generating a resulting 3D digital surface representation of the dental appliance, or a model for creating the dental appliance on, by erosion of the modified 3D digital surface representation inwards.

Accordingly, it is thus possible to create a representation of a dental appliance, or a model for creating the dental appliance on, where unwanted features such as sharp edges, undercuts etc. can be eliminated or ameliorated. In some cases, it may be advantageous to have more points in certain areas, such as near the margin between the teeth and the gingiva or above the occlusal surfaces of the molars, since this will allow for differential resolution of the resulting 3D digital surface representation. The defined value of the dilation may be set automatically or by the user. For example, a default value may be indicated depending upon which dental appliance is being generated. There may also be a graphical user interface, in which the user can set the dilation value, for example by inputting a value in mm, or moving a slider.

In some embodiments, distances to points outside the first 3D digital surface representation are given a positive value and points inside the first 3D digital surface representation are given a negative value or vice versa.

By defining the distance values in this way, it is always known which points are inside and which points are outside the surface in 3D space. This makes it possible to determine which points are inside and which points are outside the 3D digital surface. Other ways of defining the distances, such as offsetting the distance values by some factor, or similar, are also possible.

In some embodiments, each of the 3D digital surface representations are a mesh model.

In 3D modelling, it is possible to work with various graphical representations, such as voxels and meshes. In the case of working with surface representations, it may be preferred to work with meshes. This has numerous advantages. For example, the amount of data storage needed is lower for a mesh than for a voxel model, and therefore the processing power and time needed to work with a mesh model is, as a general rule, lower than for working with a voxel model.

In some embodiments, generating the modified 3D digital surface representation further comprises interpolating over the distances to the points from the surface of the first 3D digital surface representation.

It is advantageous to interpolate between the points, since this gives a more accurate modified 3D digital surface representation.

In some embodiments, the number of points in 3D space around the first 3D digital surface representation are placed in a regular grid.

Placing a regular grid, i.e. a grid with evenly space points in three dimensions around the 3D digital surface representation makes a data structure that is easier to work with than if the points are randomly placed.

The computer implemented method according to any of the preceding claims, wherein the dental appliance is a splint or a nightguard.

The method is particularly useful for dental appliances such as splints or nightguards where patient specific issues such as fissures, gaps in interproximal spaces and/or undercuts, need to be filled out for patient comfort and to achieve a splint design that can both be positioned and removed.

In some embodiments, dilation and erosion of the 3D digital surface representation of the one or more teeth minimizes concave features of the patient's molars to create space for liquid such as saliva between the splint or nightguard and the teeth of the patient.

By employing the morphological closing algorithm on the molars, the concave features of fissures on the occlusal side of the teeth will be smoothed out. Often, saliva which is not compressible, will sit in those fissures. If the splint or nightguard is designed without taking this into account, the fit of the splint to the patient's teeth may be compromised.

In some embodiments, the dental appliance is an aligner.

Clear aligner treatments are becoming more and more common as alternatives to regular braces for orthodontic treatment. The instant methods are particularly useful for designing aligners, since aligners are designed to have a tight fit against the patient's teeth, but also need to be comfortable to wear for extended periods of time.

In some embodiments, a plane or distance from the gingiva on each of the one or more teeth is defined, above which no dilation and erosion of the first 3D digital surface representation of the one or more teeth is performed.

The plane may for example be defined parallel but offset to the occlusal surface of the patient's teeth. Alternatively, the distance from the gingiva may be defined individually for each tooth, or collectively for all or a subset of the teeth. By having this boundary above which no dilation or erosion is performed, the occlusal surfaces in the resulting 3D digital representation will not be altered, which may be an advantage in aligner treatment, where it is important to control the forces working on the teeth accurately.

In some embodiments, the method further comprising:
automatically determining landmarks on the occlusal side of the one or more teeth in the first 3D digital surface representation;
determining the depth of the grooves on the occlusal side of the one or more teeth using the determined landmarks; and
restricting the dilation and/or erosion of the first 3D digital surface representation based on the determined depth of the grooves.

By automatically determining landmarks, such as cusps on the molars, the depth of the fissures or grooves in the occlusal surfaces can be determined. In this way, it is possible to restrict the morphological closing in these areas.

In some embodiments, the method further comprises generating a combined 3D digital surface representation by combining the first 3D digital surface representation and the resulting 3D digital surface representation.

The combination of the first and resulting 3D digital surface representations may be accomplished for example by using a Boolean addition operator on all or parts of the representations. By combining the first 3D digital surface representation and the resulting 3D digital surface representation, it is possible to keep features in certain areas that would otherwise be smoothed out during the process. In some cases, a lower number of points used in the process means that the resulting mesh will have a lower resolution than the first 3D mesh representing the patient's teeth. Therefore, by combining first and resulting 3D digital surface representations, it is possible to keep a high resolution of the mesh in specific areas of interest, for example the occlusal surfaces of the teeth.

In some embodiments, the method further comprises manufacturing the dental appliance. The dental appliance may be one of, but is not limited to, splints, nightguards, mouthguards, aligners, retainers, bleaching trays.

In some embodiments, a gypsum or stone model of the generated 3D digital surface representation is milled, printed or otherwise manufactured. The dental appliance may then be manufactured on top of this gypsum or stone model, for example by thermoforming techniques.

In another aspect, disclosed herein is a computer implemented method for generating a dental appliance, or for generating a model for creating the dental appliance on, comprising:
obtaining a first 3D digital volumetric representation of at least a part of a patient's jaw or jaws;
creating a number of points in 3D space around the 3D digital volumetric representation;
calculating the shortest distance from each of the points to the 3D digital volumetric representation;
generating a modified 3D digital volumetric representation by dilating the surface of the object a set value by using the calculated distances; and
generating a resulting 3D digital volumetric representation of the dental appliance, or a model for creating the dental appliance on, by erosion of the modified 3D digital volumetric representation inwards.

This also allows for the use of this disclosure in volumetric representations, such as bone scans or cone beam computed tomography (CBCT) scans.

In some embodiments, the dental appliance is a bone supported and/or tooth supported surgical guide and further comprises decreasing concave areas on the bone, thereby creating a better fit of the bone supported and/or tooth supported surgical guide.

By using the above disclosed method of dilating and eroding the 3D digital volumetric representation for designing bone supported and/or tooth supported surgical guides, the resulting surgical guides will be more comfortable for the patient during surgery. Also, the resulting surgical guide will fit the patient better and/or require less adjustment of the patient jaw to fit.

In some embodiments, the method further comprises generating a combined 3D digital volumetric representation by combining the first 3D digital volumetric representation and the resulting 3D digital volumetric representation.

The combination of the first and resulting 3D digital volumetric representations may be accomplished for example by using a Boolean addition operator on all or parts of the representations. By combining the first 3D digital volumetric representation and the resulting 3D digital volumetric representation, it is possible to keep features in certain areas that would otherwise be smoothed out during the process.

BRIEF DESCRIPTION OF THE DRAWINGS

The above and/or additional objects, features and advantages of the present invention, will be further described by the following illustrative and non-limiting detailed description of embodiments of the present invention, with reference to the appended drawing(s), wherein.

DETAILED DESCRIPTION

In the following description, reference is made to the accompanying figures, which show by way of illustration how the invention may be practiced.

Figure 1:
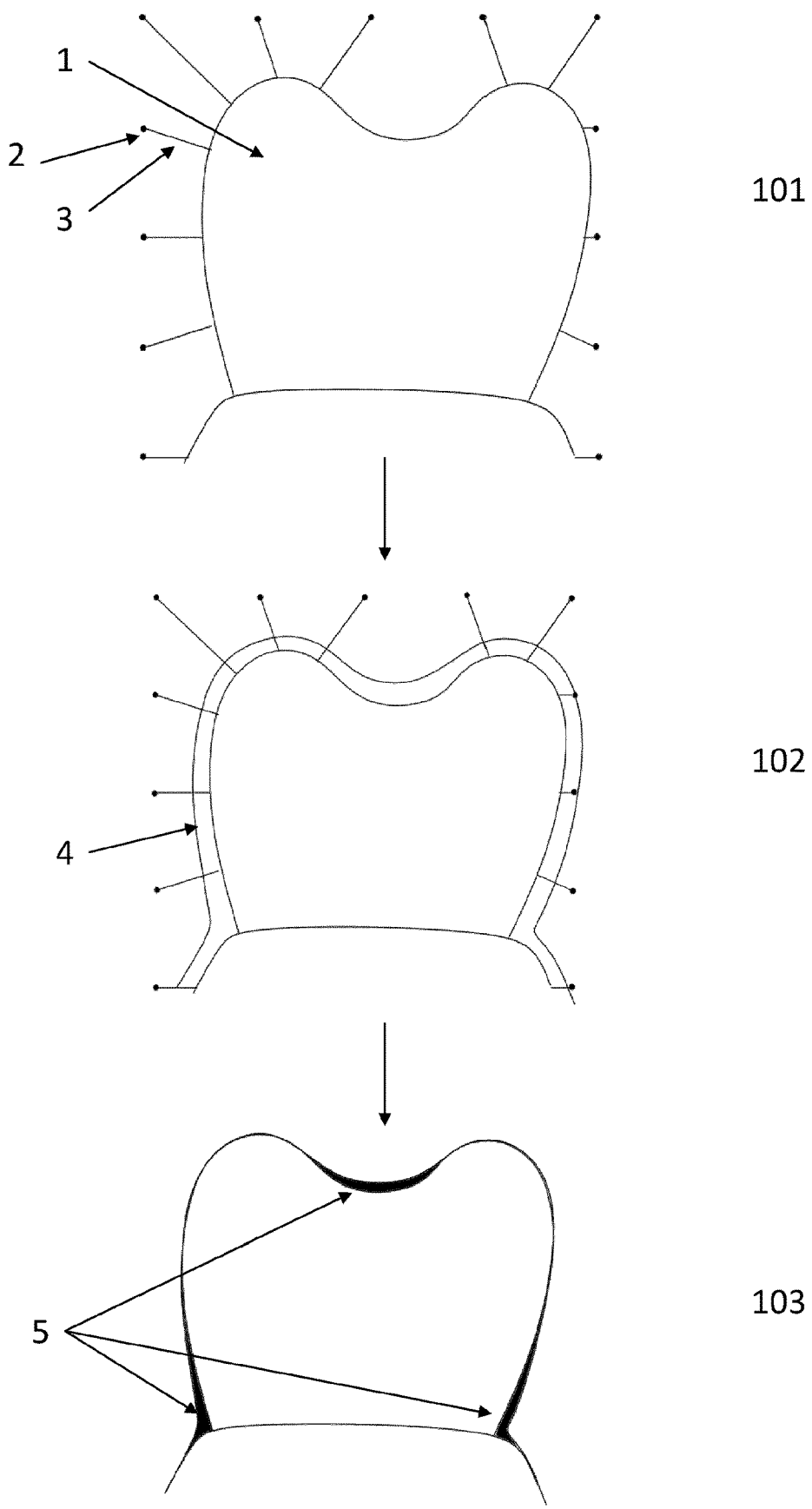
FIG. 1 visualizes the workflow of a method according to an embodiment of this invention.

An embodiment of the method disclosed herein is shown in FIG. 1. In step 101 a 2D cross sectional view of a 3D digital surface representation 1 is shown. The algorithm is run in 3D, but the figures are simplified to only show 2D. In this case, a well-defined point cloud 2 is added to the space. The point cloud could also have been a 3D grid where the nodes would function like the points 2. The shortest distance 3 from the point 2 to the 3D digital surface representation 1 is defined for all points. In step 102 a dilution distance is defined, and a new surface 4 is created by interpolation based on the known distances from 3. In step 103 the new surface 4 is eroded back onto the surface of the 3D digital surface representation 1, in a similar manner to the dilation. The areas with a decrease of the concave features 5 are marked black and convex features are not manipulated.

Figure 2:
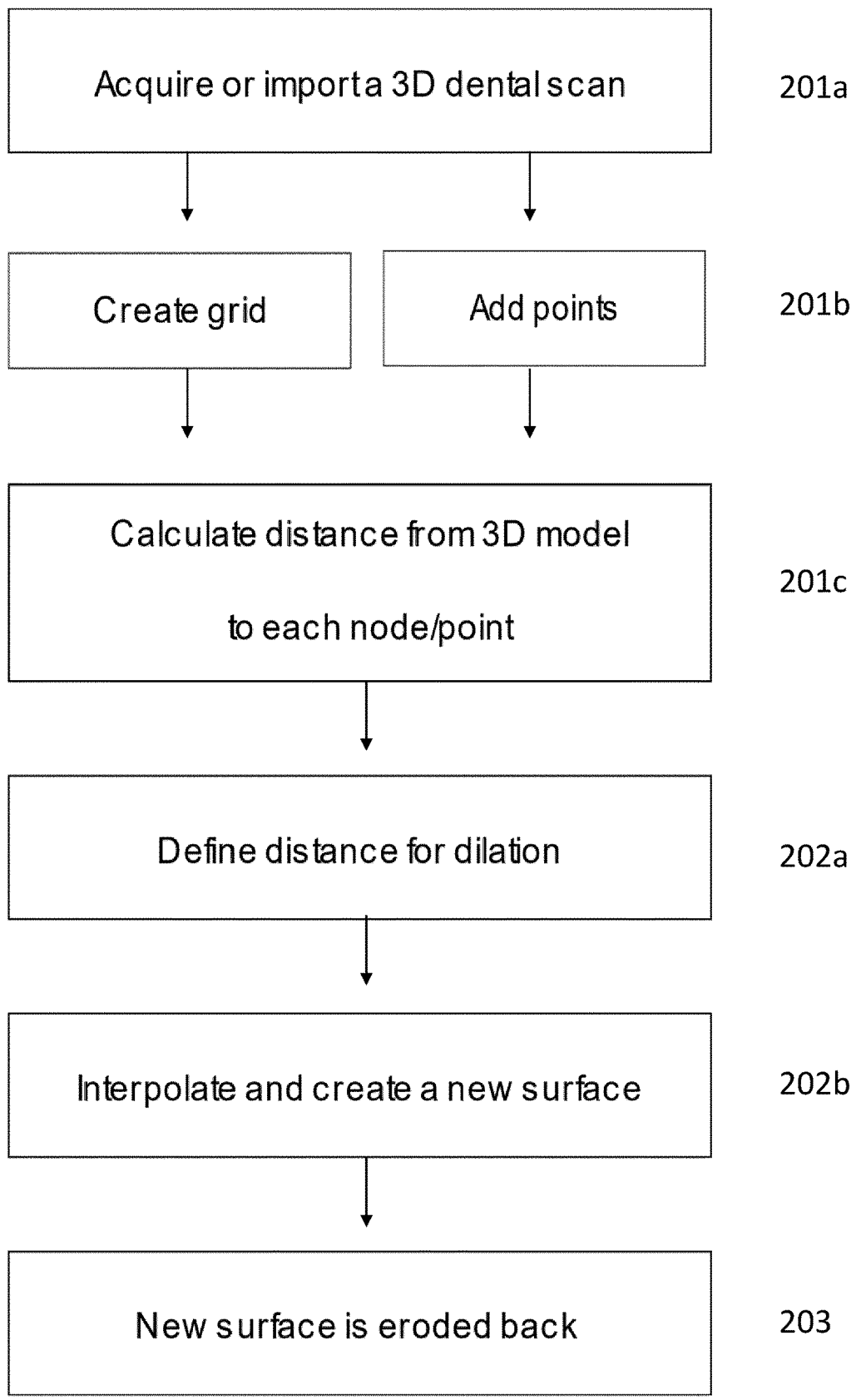
FIG. 2 shows a flow chart of a method according to an embodiment of this invention.

FIG. 2 shows a flow chart of embodiments of this disclosure. The method is initiated by importing or acquiring a 3D digital surface representation 201*a* of a patient's teeth. In step 201*b* either a grid with a specific resolution or a group of points can be added to the space with the 3D digital surface representation. The resolution and amount of points added to the space will have a direct influence on the result. A high resolution or large amount of points will create a smoother new surface, but it will also increase the algorithm's processing time. For step 201c the shortest distance from the nodes of the grid or from each point to the 3D digital surface representation are calculated. In step 202a a distance for dilation is defined. The larger this distance is the larger the decrease of the concave features will be. In step 202b a new surface is created by interpolation based on the values from step 201c and 202a. The new surface is eroded back in step 203. The erosion distance can either be the same as the earlier defined dilation distance or a different value depending on the desired outcome.

In some implementations, the erosion step 203 may include substeps similar to dilation steps 201b, 201c, 202a and 202b. Since the new surface is created in the same 3D space as the 3D digital surface representation 201a, it is possible to use the same points/grid for the erosion as was used for the dilation. Alternatively, a new set of points/grid can be added to the space containing the new surface created in step 202b. The shortest distance between the nodes of the grid or from each point to the new 3D digital surface representation are calculated. The distance for erosion is then defined. This may be either the same as the previously used dilation distance, or have a different value depending on the desired outcome. A resulting 3D digital surface representation is then generated by applying the erosion distance to the new 3D digital surface representation.

Both steps 201b and 202a can be done for specific areas of the 3D digital surface representation, meaning that there can be different degrees of morphological closing for different local areas of the surface representation.

Figure 3:
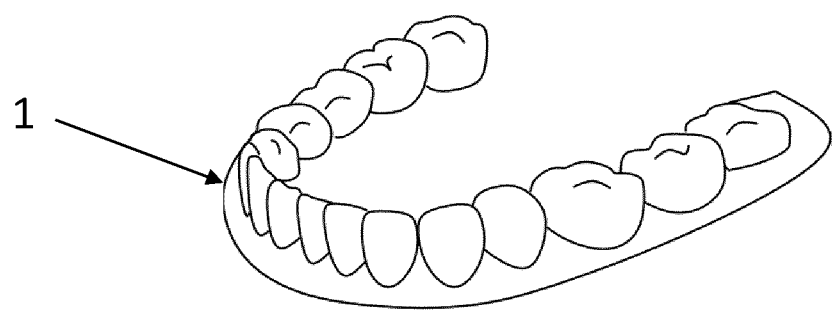
FIG. 3 shows the results of an embodiment of this invention.
Figure 3:
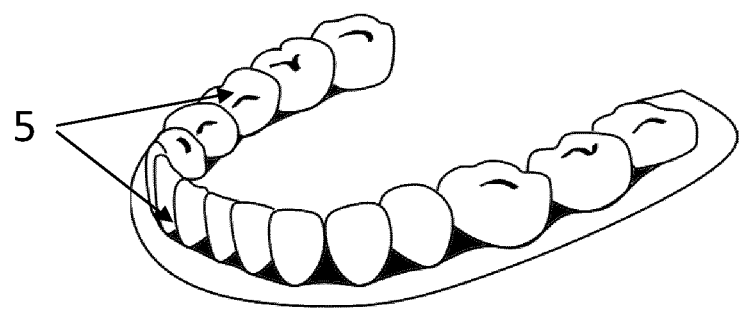
Figure 3:
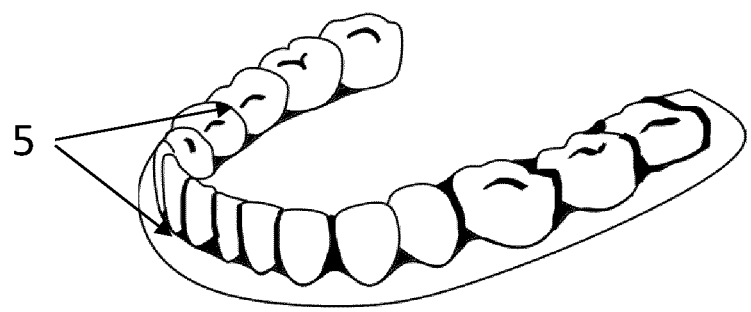
Figure 4:
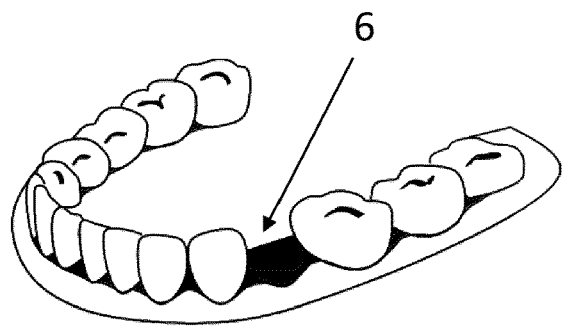
FIG. 4 shows the results of another embodiment of this invention.
Figure 4:
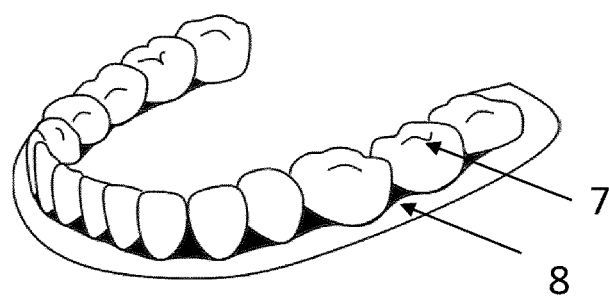
Figure 4:
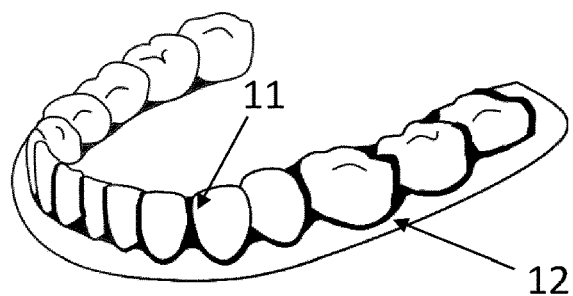
Figure 4:
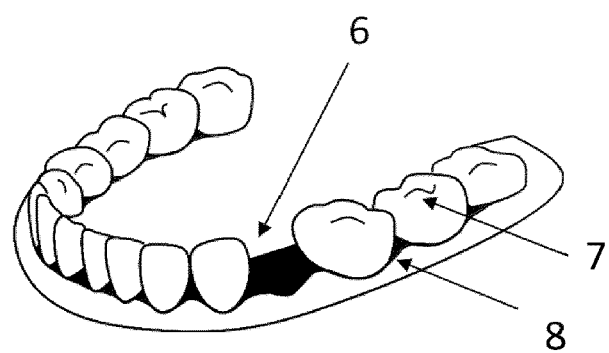

FIG. 3 and FIG. 4 gives examples of different results that can be created based on the methods described in FIG. 1 and FIG. 2. In FIG. 3 step 301a a 3D digital surface representation 1 is shown. Steps 303a-b and 403c-e shows the results after different surfaces are eroded back and a decrease of concave features are obtained.

In steps 303a and 303b the resolution of the grid utilized is the same, but the dilation distance is different. For 303a a smaller offset distance is used while 303b has decreased the concave features more by using a larger offset value. In step 403c the morphological closing algorithm has had different dilation values for different parts of the 3D digital surface representation. The offset value has been higher locally around a missing tooth 6 while the rest of the 3D digital surface representation 1 is affected with a lower and uniform offset value. If the patient had had several missing teeth or a pontic that needed higher degree of closing, several local areas with a higher offset value could be created. In 403d the algorithm has been restricted and has only had an effect on the undercuts 8 of the 3D digital surface representation 1. The restriction can be done in many ways. For example, it can be done manually by the user defining areas where no effect is desired, or automatically by defining landmarks on the 3D digital surface representation to determine the areas with grooves and block them out from the algorithm. One technique that can be used to define areas to block out from the algorithm, is to segment the 3D digital surface representation, i.e. determine what part of the surface belongs to teeth, what belongs to gingiva, etc. Segmentation can be done both manually and/or automatically, with various segmentation techniques known in the field.

Another restricted method is shown in 403e. The algorithm detects the areas of the surface model where there is a contact point between teeth 11 and between teeth and gingiva 12. These areas of the surface are manipulated by morphological closing, resulting in fissures not being affected.

Another way of compensating for missing tooth, pontics or deep grooves is to run through the flow chart described in FIG. 1 with a global offset value. After eroding the surface back, a new manipulated 3D digital file is created. Superimposing the manipulated file and the original 3D digital representation the concave areas that have been decreased can be identified by determining the areas between the two surfaces that are not in contact. Areas where no effect is desired can be chosen and compensated for.

In 403f the different methods are combined. Locally around a missing tooth, a high offset value 6 is used. The undercuts and proximal areas 8 are filled out with a lower offset value, while the grooves on the occlusal surface of the tooth are not affected 7.

Figure 5:
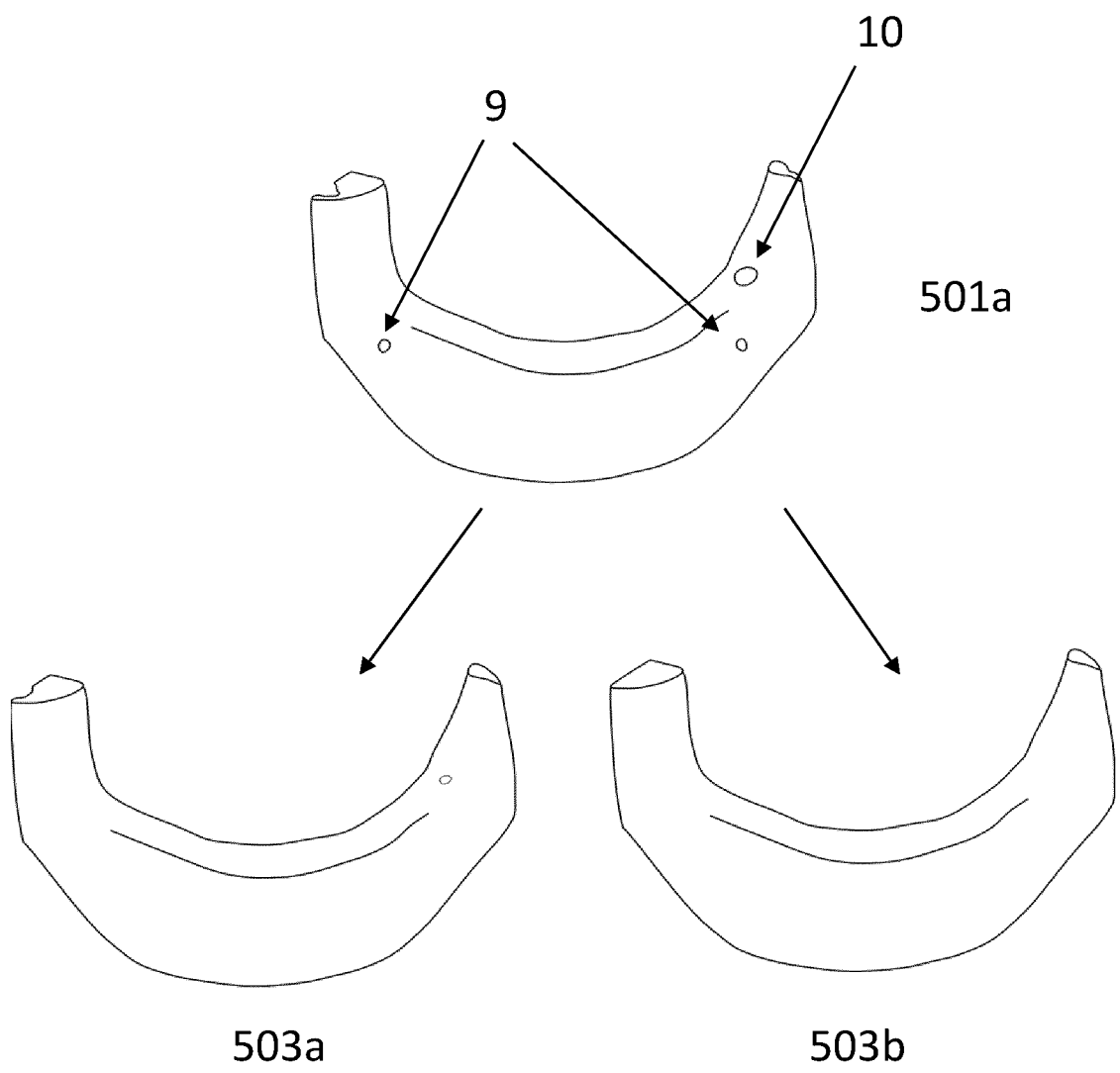
FIG. 5 shows the results of an embodiment performed on a CBCT scan of a mandible.

FIG. 5 depicts a CBCT model of a patient's mandible. In this example, the mandible bone has three holes: two from the mental foramens 9 and one larger socket from a tooth extraction 10. Depending on the offset value, the concave features will either be decreased or fully covered. The new algorithm will also decrease inward bumps that may be caused by lower resolution CT images and/or caused by voxel filling. Since a voxel in a CBCT model has the average hardness of the volume, if for example the actual bone surface is $\frac{1}{3}$ of the way into a certain voxel, it may be below the threshold, while $\frac{2}{3}$ may put it above the threshold. In this scenario, two neighboring voxels will result in one voxel "overestimating" the surface while the second voxel "underestimates" the surface. 503a has been modified by a lower offset value than 503b.

Figure 6:
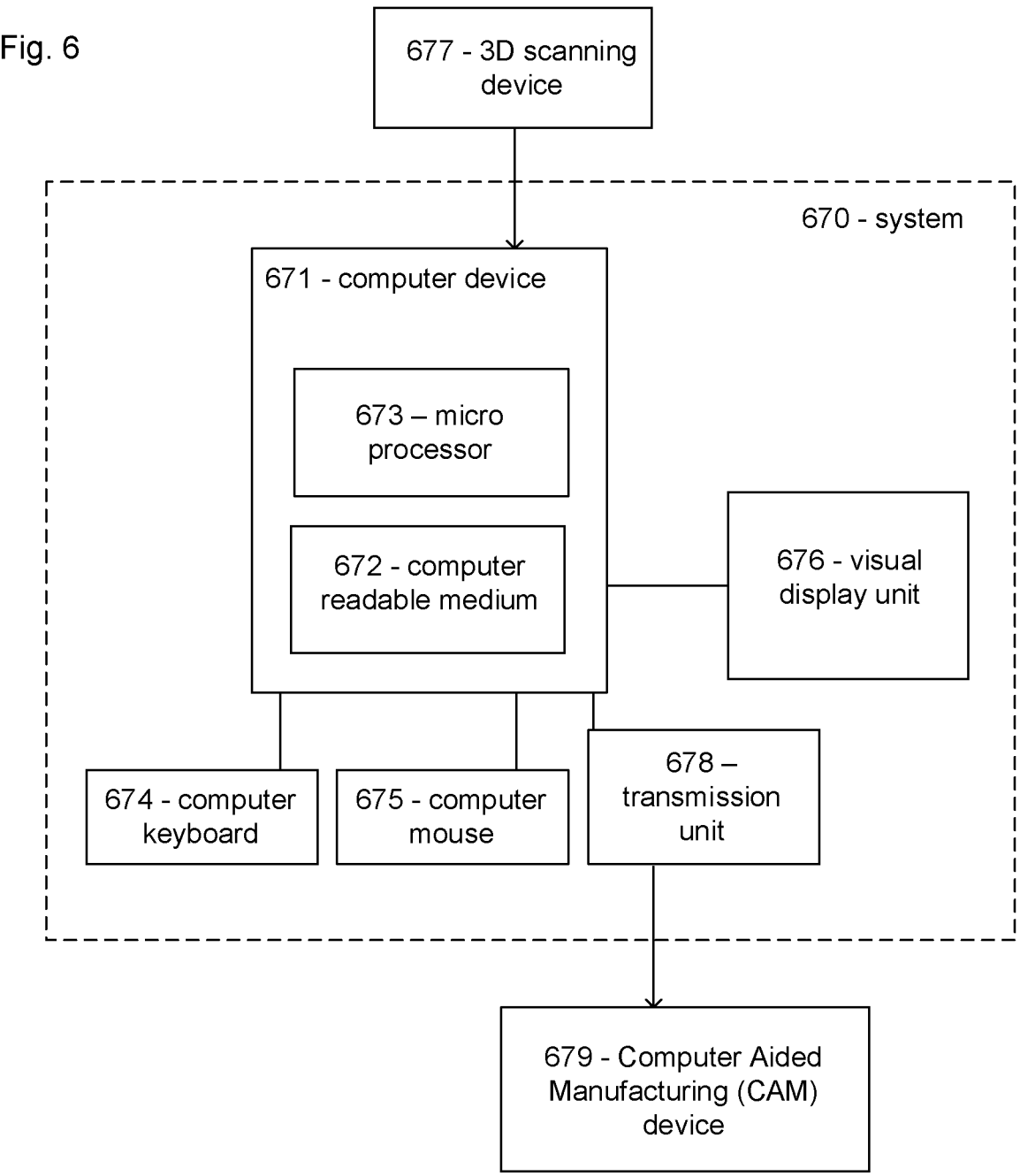
FIG. 6 shows a schematic of a system according to an embodiment of the disclosure.

FIG. 6 shows a schematic of a system according to an embodiment of the invention. The system 670 comprises a computer device 671 comprising a computer readable medium 672 and a microprocessor 673. The system further comprises a visual display unit 676, a computer keyboard 674 and a computer mouse 675 for entering data and activating virtual buttons visualized on the visual display unit 676. The visual display unit 676 can be a computer screen. The computer device 671 is capable of obtaining 3D digital surface and/or volumetric representations of one or more teeth of a patient. The obtained 3D digital representations can be stored in the computer readable medium 672 and provided to the processor 673. The computer device 671 is configured for executing the steps of the claimed methods.

The system comprises a unit 678, which may be separate from or part of the computer device 671, for transmitting the resulting 3D digital surface and/or volumetric representations to e.g. a computer aided manufacturing (CAM) device 679 for manufacturing the dental appliance, or to another computer system e.g. located at a separate manufacturing center where the dental appliances are manufactured. The unit for transmitting can be a wired or a wireless connection.

The 3D scanning of the patient's set of teeth using the 3D scanning device 677 can be performed at a dentist while the designing of the dental appliance may be performed either at the dentist or at a separate facility such as a dental laboratory. In such cases the 3D digital surface and/or volumetric representation of the patient's set of teeth can be provided via an internet connection between the dentist and the dental laboratory.

Rather than scanning the patient's teeth using an intraoral scanner to obtain the first 3D digital surface representation, it is also possible to take a traditional impression of the patient's teeth using manual methods. These impressions can then be sent to a dental laboratory, where they can either be scanned directly, or be used to pour a gypsum or stone model of the patient's dentition. In this scenario, the 3D scanning device 677 can be a desktop lab scanner situated at the dental laboratory, and the first 3D digital surface representation can then be obtained by scanning either the impressions directly, or by scanning the gypsum or stone models.

When the system 670 receives a 3D digital surface and/or volumetric representation the steps of the claimed methods are executed on the computer device 671 and the digital output is presented on the visual display unit 676. If the user is not satisfied, the output can be edited by using the computer keyboard 674 and mouse 675. When a satisfying result is achieved, it will be transmitted through 678 to a CAM device 679 where a physical appliance is produced. The desired output will depend on the type of physical appliance that is needed.

If a splint is the final product the output from 671 can be a negative model of the teeth, that is created based on the resulting 3D digital surface representation. The negative model of the teeth is thereafter transmitted to 679 for manufacturing. The output for a splint, after executing the claimed methods, can also be the first and resulting 3D digital surface representations combined. The combined model of the dental arch can then be used in ex. 3shape Splint Studio, on the computer device 671 to create a splint that is manufactured on 679.

For an aligner the output which is transmitted by 678 to a CAM device 679 can be the first and resulting 3D surface representations combined. The combined surface representation of a dental arch can be printed or milled on 679 and used for thermoforming an aligner.

The output from a 3D digital volume representation can be used by the user with 670 to create a bone supported surgical guide in ex. 3shape Implant Studio, which is then transmitted through 678 to a CAM device 679.

Although some embodiments have been described and shown in detail, the invention is not restricted to them, but may also be embodied in other ways within the scope of the subject matter defined in the following claims. In particular, it is to be understood that other embodiments may be utilized and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

A claim may refer to any of the preceding claims, and "any" is understood to mean "any one or more" of the preceding claims.

The term "obtaining" as used in this specification may refer to physically acquiring for example medical images using a medical imaging device, but it may also refer for example to loading into a computer an image or a digital representation previously acquired.

It should be emphasized that the term "comprises/comprising" when used in this specification is taken to specify the presence of stated features, integers, steps or components but does not preclude the presence or addition of one or more other features, integers, steps, components or groups thereof.

The features of the method described above and in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

The invention claimed is:

1. A computer implemented method for generating a dental appliance, or for generating a model for creating the dental appliance on, comprising:
   obtaining a first 3D digital surface representation of one or more teeth of a patient;
   creating a number of points in 3D space around the 3D digital surface representation,
   calculating a shortest distance from each of the points to the 3D digital surface representation;
   generating a modified 3D digital surface representation by dilating the surface of the one or more teeth a defined value by using the calculated distances; and
   generating a resulting 3D digital surface representation of the dental appliance, or a model for creating the dental appliance on, by erosion of the modified 3D digital surface representation inwards.

2. The computer implemented method according to claim 1, wherein each of the 3D digital surface representations are a mesh model.

3. The computer implemented method according to claim 1, wherein generating the modified 3D digital surface representation further comprises interpolating over the distances to the points from the surface of the first 3D digital surface representation.

4. The computer implemented method according to claim 1, wherein the points in 3D space around the first 3D digital surface representation are placed in a regular grid.

5. The computer implemented method according to claim 1, wherein the dental appliance is a splint or a nightguard.

6. The computer implemented method according to claim 5, wherein dilation and erosion of the 3D digital surface representation of the one or more teeth minimizes concave features of molars to create space for liquid such as saliva between the splint or nightguard and the teeth of the patient.

7. The computer implemented method according to claim 1, wherein the dental appliance is an aligner.

8. The computer implemented method according to claim 7, further comprising defining an upper limit on each of the one or more teeth, above which no dilation and erosion of the first 3D digital surface representation of the one or more teeth is performed.

9. The computer implemented method according to claim 7, further comprising:
   automatically determining landmarks on an occlusal side of the one or more teeth in the first 3D digital surface representation;
   determining a depth of grooves on the occlusal side of the one or more teeth using the determined landmarks; and
   restricting the dilation and/or erosion of the first 3D digital surface representation based on the determined depth of the grooves.

10. The computer implemented method according to claim 1, further comprising generating a combined 3D digital surface representation by combining the first 3D digital surface representation and the resulting 3D digital surface representation.

11. The computer implemented method according to claim 1, wherein:
- the method is for generating a dental appliance; and
- the method includes generating a resulting 3D digital surface representation of the dental appliance by erosion of the modified 3D digital surface representation inwards.

12. The computer implemented method according to claim 1, wherein:
- the method for generating a model for creating the dental appliance on; and
- the method includes generating a resulting 3D digital surface representation of the model for creating the dental appliance on by erosion of the modified 3D digital surface representation inwards.

* * * * *